(12) United States Patent
Scribner et al.

(10) Patent No.: US 7,914,060 B2
(45) Date of Patent: Mar. 29, 2011

(54) VEHICLE CARGO AREA EXTENDER AND STEP

(75) Inventors: Bryan Scribner, Fort Worth, TX (US); Bradley J. Scribner, Fort Worth, TX (US)

(73) Assignee: Bryan Scribner, Fort Worth, TX (US)

( * ) Notice: Subject to any disclaimer, the term of this patent is extended or adjusted under 35 U.S.C. 154(b) by 0 days.

(21) Appl. No.: 12/208,797

(22) Filed: Sep. 11, 2008

(65) Prior Publication Data

US 2009/0072566 A1    Mar. 19, 2009

Related U.S. Application Data (60) Provisional application No. 60/972,075, filed on Sep. 13, 2007.

(51) Int. Cl.
*B60R 9/06* (2006.01)
(52) U.S. Cl. .............. 296/26.08; 224/519; 224/524
(58) Field of Classification Search .......... 296/26.08, 296/26.09, 26.01; 224/402–405, 519, 521, 224/524; 280/759
See application file for complete search history.

(56) References Cited

U.S. PATENT DOCUMENTS

| | | | | |
|---|---|---|---|---|
| 2,468,579 A | * | 4/1949 | Vuori | 296/26.09 |
| 2,784,027 A | | 3/1957 | Temp | |
| 3,528,578 A | * | 9/1970 | Schoenberger | 414/462 |
| 4,951,991 A | | 8/1990 | Haigler | |
| 5,458,389 A | * | 10/1995 | Young | 296/26.08 |
| 5,509,709 A | | 4/1996 | Carroll | |
| 5,649,731 A | * | 7/1997 | Tognetti | 296/26.09 |
| 5,820,190 A | * | 10/1998 | Benner | 296/26.09 |
| 5,938,262 A | | 8/1999 | Mills | |
| 6,065,792 A | * | 5/2000 | Sciullo et al. | 296/26.09 |
| 6,082,800 A | | 7/2000 | Schambre et al. | |
| 6,113,171 A | * | 9/2000 | Stearns | 296/26.08 |
| 6,237,824 B1 | * | 5/2001 | Bagley | 224/521 |
| 6,283,526 B1 | | 9/2001 | Keough et al. | |
| 6,312,034 B1 | | 11/2001 | Coleman, II et al. | |
| 6,328,366 B1 | | 12/2001 | Foster et al. | |
| 6,491,331 B1 | * | 12/2002 | Fox | 296/26.09 |
| 6,517,137 B2 | | 2/2003 | Kiester et al. | |

(Continued)

OTHER PUBLICATIONS

Darby Industries, Inc., Falls, PA; Extend a Truck; extendatruck.com; 3 pages, Sep. 10, 2008.

(Continued)

*Primary Examiner* — Glenn Dayoan
*Assistant Examiner* — Gregory Blankenship
(74) *Attorney, Agent, or Firm* — Geoffrey A. Mantooth (57) ABSTRACT

The vehicle cargo extender allows a user to effectively extend the bed of a vehicle to accommodate and support cargo having dimensions extending beyond an unmodified bed. The extender has a deck assembly and an arm assembly. The deck, which may be folded for easier storage, forms a floor on which cargo may rest. The arm assembly comprises an extension tube, a storage receiver tube, a crosspiece receiver tube, and a crosspiece assembly. The extension tube, when in use, is inserted into and secured within a receiver hitch. The deck is coupled with the arm assembly. The user may also attach a shelf assembly to the arm assembly to carry additional cargo. When in the stowed position, the crosspiece is coupled to the crosspiece receiver tube and may have reflectors or auxiliary taillights. The storage receiver tube and crosspiece may be nested and secured together within a receiver hitch. When in the stowed position, the arm assembly forms a step to allow the user easy access to the pickup truck bed.

13 Claims, 8 Drawing Sheets

U.S. PATENT DOCUMENTS

| | | | | |
|---|---|---|---|---|
| 6,533,337 B1 * | 3/2003 | Harshman et al. | ......... | 296/26.08 |
| 6,648,391 B1 * | 11/2003 | Whiteford et al. | ......... | 296/26.08 |
| 6,705,656 B2 * | 3/2004 | Keller | ......... | 296/26.09 |
| 6,834,902 B2 * | 12/2004 | Agan | ......... | 296/26.08 |
| 6,860,536 B1 * | 3/2005 | Schimunek | ......... | 296/26.09 |
| 7,066,365 B2 * | 6/2006 | Brown | ......... | 224/401 |
| 7,090,104 B2 * | 8/2006 | Dorety | ......... | 224/524 |
| 7,207,615 B2 * | 4/2007 | St. Romain | ......... | 296/26.09 |
| 7,234,966 B2 * | 6/2007 | Choy | ......... | 439/541.5 |
| 7,416,234 B2 * | 8/2008 | Bequette | ......... | 296/26.09 |
| 7,543,873 B1 * | 6/2009 | Thornsberry | ......... | 296/26.09 |
| 2002/0180231 A1 | 12/2002 | Fox | | |
| 2003/0168876 A1 | 9/2003 | Kiester et al. | | |
| 2004/0007889 A1 * | 1/2004 | Hebert | ......... | 296/26.09 |

OTHER PUBLICATIONS

Lund Hitch Hand Truck Bed Extender; www.realtruck.com; 3 pages; not sure this is prior art, Sep. 11, 2008.

* cited by examiner

Fig. 12

VEHICLE CARGO AREA EXTENDER AND STEP

This application claims the benefit of U.S. provisional application Ser. No. 60/972,075, filed Sep. 13, 2007.

FIELD OF THE INVENTION

The present invention relates to an apparatus used to extend the length of the cargo area of a vehicle which, when extended, allows the operator to safely carry and transport goods and materials exceeding the length of the existing cargo area, and, when not in use, is easily stowed.

BACKGROUND OF THE INVENTION

In general, vehicles such as trucks are used to carry cargo. The area for the cargo is typically located behind the truck cab. The cargo area may be open or enclosed. If enclosed, a rear door allows access to the cargo area.

One type of truck is known as a "pickup". Pickups range in size from compact trucks with payloads of less than a 1000 pounds to full size vehicles with payloads in excess of 5000 pounds. In considering which pickup to buy, consumers typically base their decision, in part, on their usual carrying needs as well as maneuverability. Trucks with longer beds, and thus longer wheel bases are often less maneuverable than shorter bed trucks, but carry more cargo. Shorter bed trucks are more easily maneuvered, but carry less cargo. Regardless of the length of the bed, users occasionally encounter instances in which the bed is simply not long enough for the desired application such as carrying lumber or transporting all terrain vehicles (ATVs).

Lumber is often sold in twelve foot lengths while the bed lengths of the most popular pickups are only six to eight. Therefore, a sizeable portion of this size lumber, if transported in a bed with these dimensions, is left unsupported. Likewise, ATVs are often transported singularly in the beds of pickups because the overall length of some pickups prohibits transporting more than one.

What is needed is a device that will permit truck operators to increase the truck's dimensional carrying capacity. The object of the present invention is to provide a truck bed extender that allows a truck operator to extend the length of a truck bed or cargo area when needed for carrying oversized cargo, and that is easily stowed in a "footstep" position when the added length is not necessary.

SUMMARY OF THE INVENTION

The present invention provides a vehicle cargo area extender that comprises a deck and an arm assembly. The deck has bottom and top surfaces and is movable with respect to the vehicle. The arm assembly comprises a horizontal member, a first vertical member and a second vertical member. The horizontal member is capable of being inserted into a trailer hitch receiver. The first and second vertical members are coupled to the horizontal member. The second vertical member is capable of being inserted into the trailer hitch receiver, wherein the arm assembly may be placed in a stowed position. A crosspiece assembly has a stem for removably coupling to either the first vertical member or the second vertical member.

In accordance with one aspect of the present invention, the deck comprises a plurality of planks coupled together.

In accordance with still another aspect of the present invention, the deck further comprises angle brackets coupled to the deck planks and removably coupled to the crosspiece.

In accordance with still another aspect of the present invention, two or more of the planks are coupled together with hinges.

In accordance with still another aspect of the present invention, the deck may be removably coupled to the crosspiece.

In accordance with still another aspect of the present invention, the deck may be removably coupled to the crosspiece with pins.

In accordance with still another aspect of the present invention, the crosspiece further comprises a vertical base that is removably coupled to either the first vertical member or the second vertical member.

In accordance with still another aspect of the present invention, the crosspiece has lights.

In accordance with still another aspect of the present invention, the crosspiece has reflectors.

In accordance with still another aspect of the present invention, the vertical member is removably coupled to the crosspiece when the arm assembly is in the stowed position.

In accordance with still aspect of the present invention, the arm assembly in the stowed position forms a step when the arm assembly is coupled to a vehicle.

In accordance with still another aspect of the present invention, a shelf is coupled to the arm assembly.

DESCRIPTION OF THE PREFERRED EMBODIMENT

The present invention provides a removable and easily stowable extender for a vehicle cargo area. Although in the preferred embodiment, the particular vehicle described is a pickup, the invention can be used on other types of vehicles, including those with open cargo areas (such as pickups) and those with closed cargo areas (such as moving vans).

In the description that follows and in the figure descriptions, terms such as "front", "rear", "side", "top" and "bottom" are used, with respect to the orientation of one standing at the rear of the truck looking toward the front.

Figure 1:
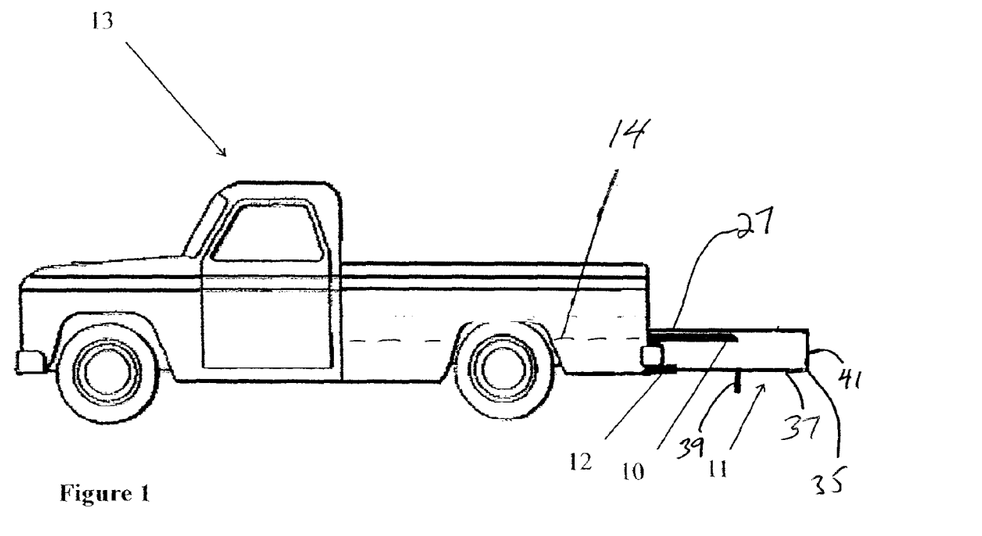
FIG. 1 is a side view of a pickup truck and the bed extender of the present invention, with the deck assembly in place, in accordance with a preferred embodiment.
Figure 2:
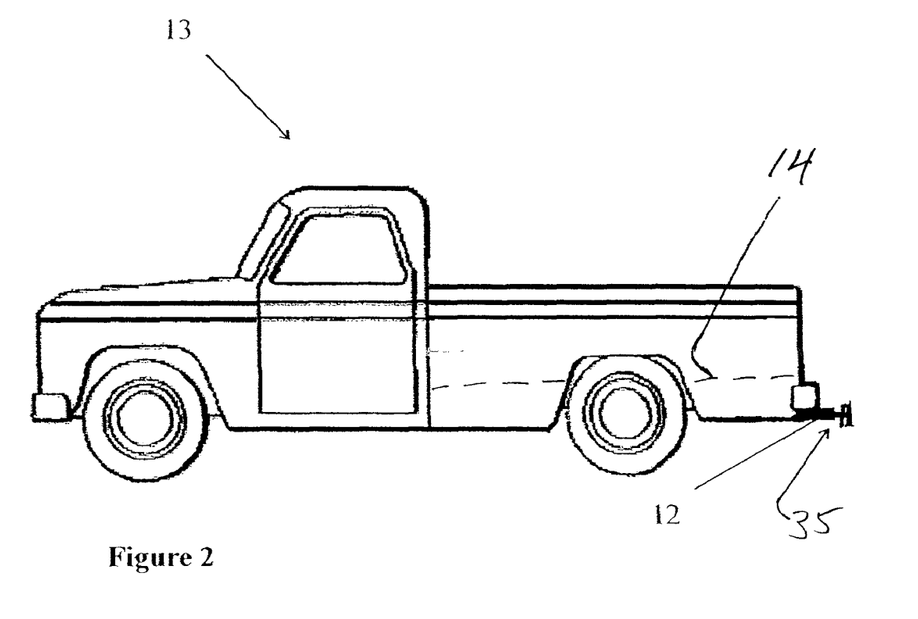
FIG. 2 is a side view of a pickup truck with the bed extender in the stowed position.

In FIG. 1, there is shown a side view of a pickup truck 13 with the bed extender 11 of the present invention, in accordance with a preferred embodiment. The bed extender 11 is comprised of two primary assemblies: a deck assembly 27, and an arm assembly 35. Together, these assemblies allow a user to effectively extend the bed of a pickup truck 13 to accommodate and support cargo having dimensions extending beyond an unmodified vehicle bed 14. The bed extender 11 in FIG. 1 is shown with the deck assembly 27 in place and the tailgate 10 is down. In FIG. 2, there is shown the pickup truck 13 with the arm assembly 35 of the bed extender in the stowed position and the tailgate 10 closed. The deck assembly can be placed in the pickup bed 14 when not in use.

Figure 3:
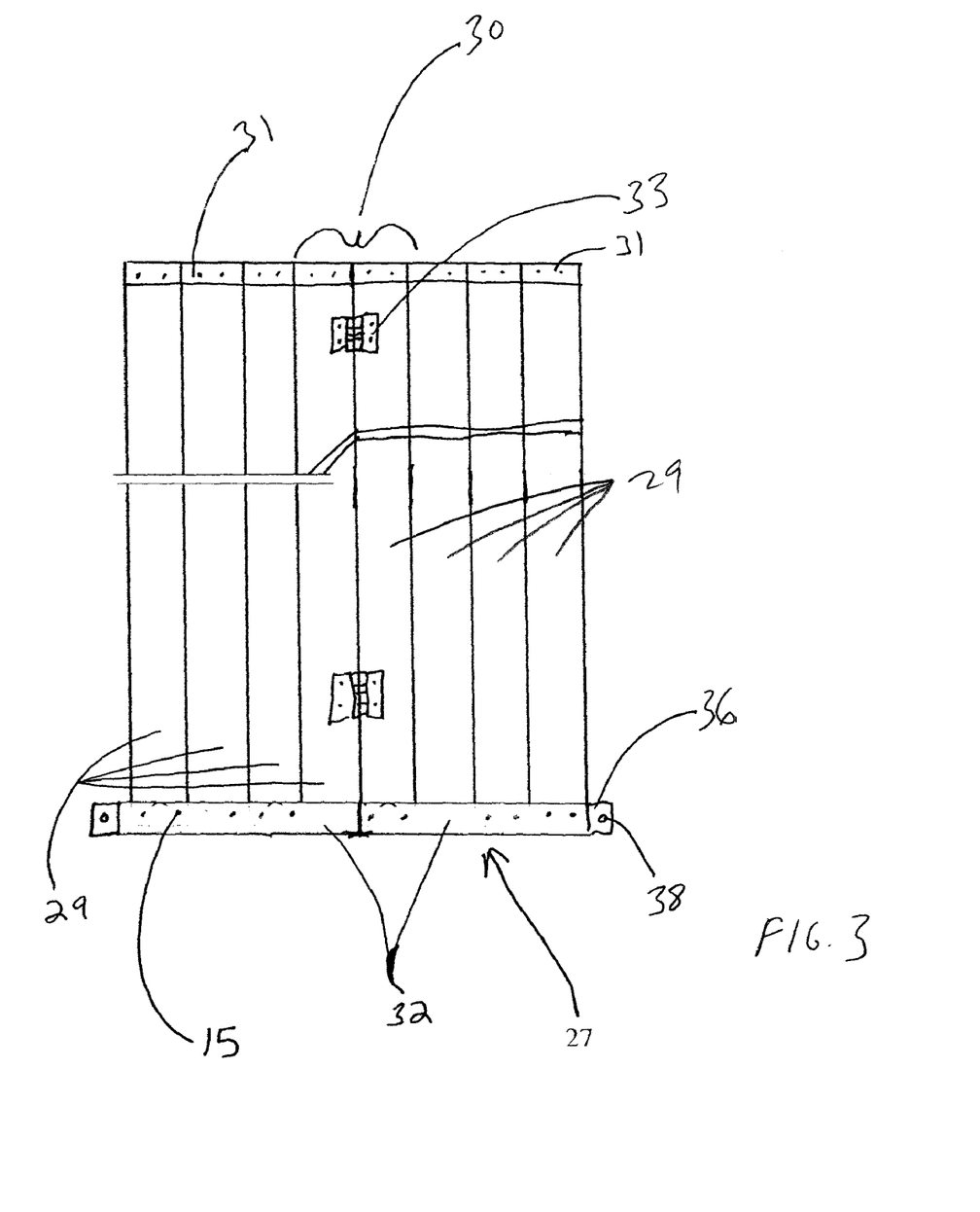
FIG. 3 is a plan view of the deck assembly.
Figure 4:
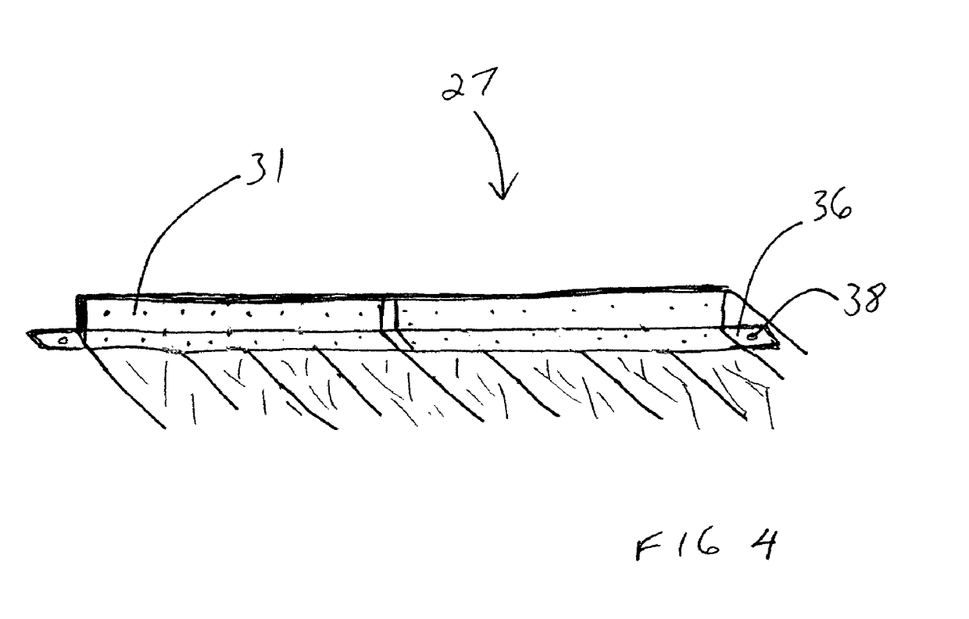
FIG. 4 is an isometric view showing the rear-most end, bottom and right side of the deck assembly.

As will be explained in more detail below, the deck assembly 27 forms a floor on which cargo may rest. It is the deck assembly 27 that is used to extend the bed 14 and provide additional cargo area. In FIGS. 3 and 4 there is shown the deck assembly 27. This assembly 27 is comprised of a deck comprised of deck planks 29, one or more front angle brackets 31, one or more rear angle brackets 32, and fasteners 15.

In FIG. 3, there is shown the deck assembly 27. In the preferred embodiment, the width of the deck assembly 27 is sized so as to fit within the truck bed. If the truck bed 14 has wheel wells (not shown), the width can be so as to fit within the wheel wells. Additionally, as may be seen in FIG. 3, one or more of the planks 29 may be hingedly attached with hinges 33 to an adjacent plank 29. In the preferred embodiment, the two center-most planks 30 are hingedly attached to each other. This allows the deck assembly 27 to be folded at the hinges 33 for easier storage.

The deck assembly 27 forms an extension of the cargo area when it is coupled with the arm assembly 35. The planks 29 can be made from a variety of materials, such as wood, welded steel, aluminum, or polycarbonate. The cross-section of the planks 29 can be rectangular, square, circular, or some other shape. In the preferred embodiment, the planks 29 are made from wood. The planks 29 are joined with the front angle brackets 31 across the respective front end of the planks 29 and joined with the rear angle brackets 32 (FIG. 4) across the rear end. In the preferred embodiment, the angle brackets 31, 32 are made from a piece of angle polycarbonate or metal and span across the front and rear edges of a series of planks 29. However, these angle brackets 31 need not be formed from polycarbonate, but may be formed from a variety of materials. When hinges 33 are employed, as shown in FIG. 3, a plurality of front and rear angle brackets 31, 32 are present. Therefore, the front and rear angle brackets 31, 32 only individually span across a portion of the planks, 29, so as to allow the deck assembly 27 to be folded. The rear angle brackets 32 have deck attachment wings 36 extending from their ends. The angle brackets 31, 32 are coupled, either directly or indirectly, to each plank 29 so that the planks 29 may be moved as a single unit. In the preferred embodiment, the central planks 30 are coupled to the brackets 31, 32 with screw fasteners 15, however, any conventional coupling mechanism will suffice.

When in the extended position, the deck assembly 27 is supported by the arm assembly 35. The arm assembly has an extension, shown in FIGS. 5-6 and a crosspiece, shown in FIGS. 7-9. This assembly 35 comprises an extension tube 37, a storage receiver tube 39, a crosspiece receiver tube 41, and the crosspiece assembly 47. In the preferred embodiment, this entire assembly 35 is made of powder coated steel tubing, but may be made of a variety of materials.

Figure 5:
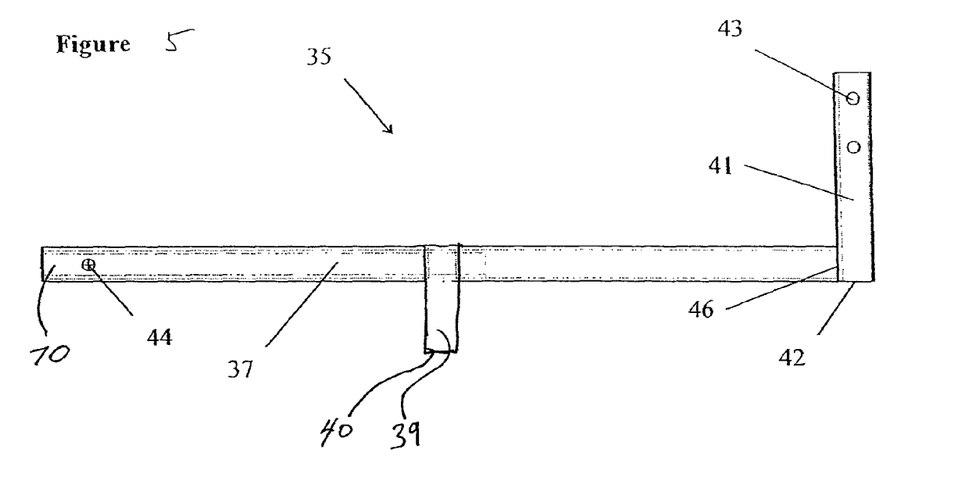
FIG. 5 is a left side view of the arm assembly (without the crosspiece assembly).
Figure 6:
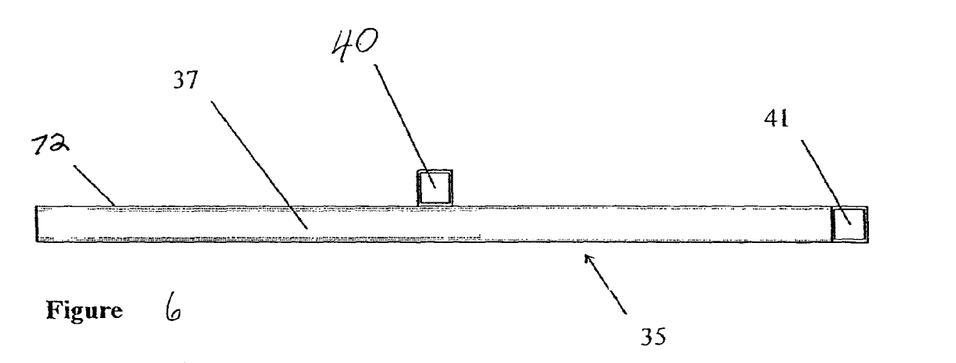
FIG. 6 is a top view of the arm assembly (without the crosspiece assembly.)

The extension tube 37, when in use, is inserted into a receiver hitch 12 of the vehicle (FIGS. 1, 2 and 12) and has a hole 44 to allow a pin or other attachment device to secure the extension tube 37 to the receiver hitch. Referring to FIGS. 5-6, the crosspiece receiver tube 41 is joined at the lower end 42 with the rear end 46 of the extension tube 37, and extends upward from the extension tube 37 when the front end 47 of the extension tube 37 is inserted into the receiver hitch 12 so as to form a sideways "L".

At approximately the midpoint of the extension tube 37, the storage receiver tube 39 is attached. This tube 39 is attached to one side 72 of the extension tube 37 and its length runs parallel to and in the opposite direction from the crosspiece receiver tube length 41. Thus, as shown in FIG. 5 the storage receiver tube 39 depends down. When the arm assembly is in the stowed position, the insertion end 40 of the storage receiver tube 39 is inserted into the receiver hitch 12 and secured with a pin or other attachment device. The storage receiver tube 39 has internal dimensions slightly greater than the external dimensions of the crosspiece base 49 to allow the crosspiece base 49 to be inserted into and, thus, nested within the storage receiver tube 39 and secured with a pin or other attachment device.

Figures 7, 8, 9:
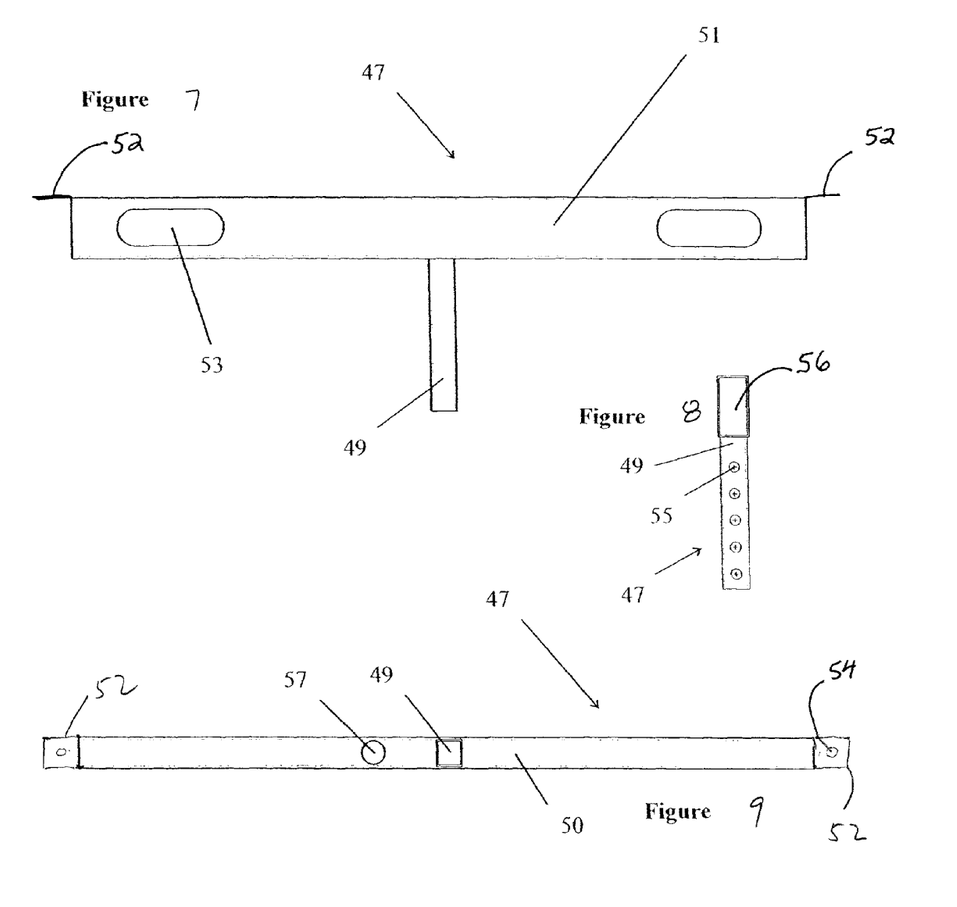
FIG. 7 is a rear view of the crosspiece assembly.
FIG. 8 is a side view of the crosspiece assembly.
FIG. 9 is a bottom view of the crosspiece assembly.

In FIGS. 7-9, there is shown the crosspiece assembly 47, comprising a crosspiece 51 and a crosspiece base 49. On the rear side of each end of the crosspiece 51, there are cutouts 53. These cutouts 53 are receptacles for reflectors or auxiliary taillights. At approximately the midpoint of the crosspiece 51, and on the lower side of the crosspiece 51, the crosspiece base 49 is perpendicularly coupled to the crosspiece 51. The crosspiece base 49 extends downward from the crosspiece 51. The crosspiece base 49 may be inserted into the crosspiece receiver tube 41. On the sides of the crosspiece base 49 are holes 55 (FIG. 8) to allow a pin or other attachment device to secure the crosspiece base 49 to the crosspiece receiver tube 41. These holes 55 also allow the crosspiece base 49 to be secured within the storage receiver tube 39 (FIG. 5). The crosspiece base 49 and storage receiver tube 39 may then be secured within the receiver hitch 12 with a pin or other attachment device. Referring to FIG. 9, on the lower surface 50 of the crosspiece 51, there is a cutout 57 to allow wiring to be inserted into the crosspiece 51.

As may be seen in FIGS. 7 and 9, at either end, and extending laterally from the top of the crosspiece 51, are crosspiece attachment wings 52. Each crosspiece attachment wing 52 has a crosspiece attachment wing hole 54 (FIG. 9) that allows the deck attachment wing 36 (FIG. 4) to be removably coupled to the crosspiece 47 through the deck attachment wing hole 38.

Figure 11:
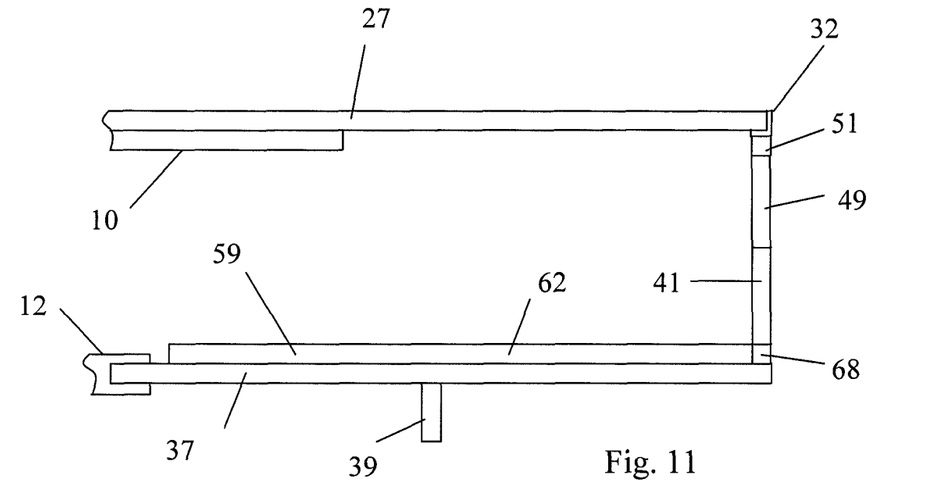
FIG. 11 is a left side view of the bed extender in the use position.
Figure 12:
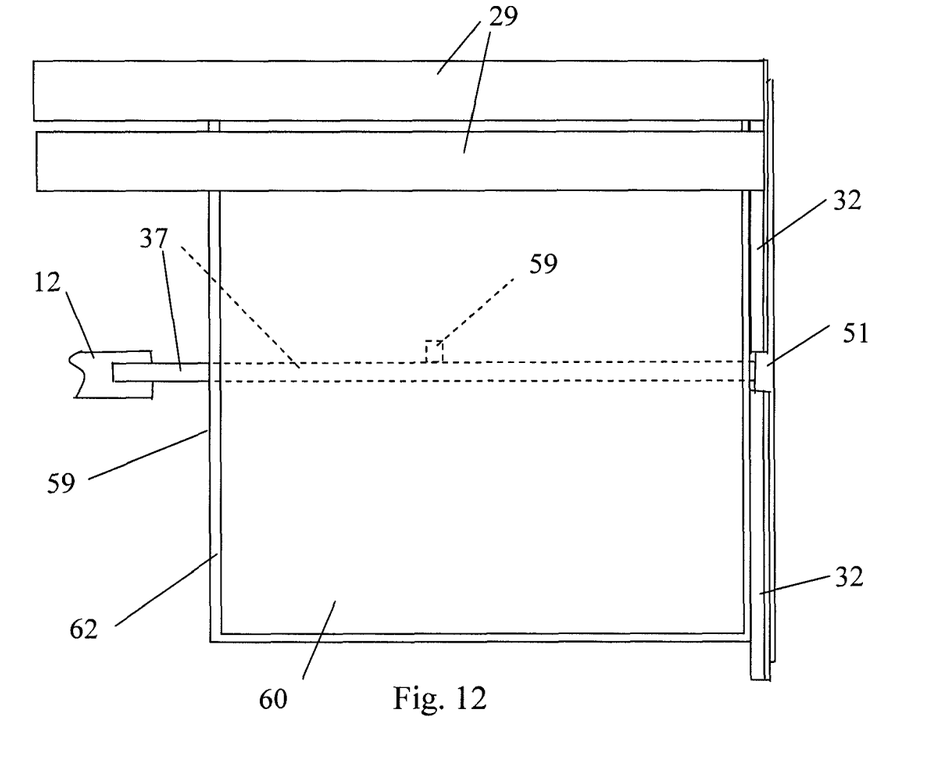
FIG. 12 is a top view of the bed extender of FIG. 11.

In FIGS. 11 and 12 there is shown a shelf assembly 59 which may, at the option of the user, be used to carry additional cargo. This assembly 59 is comprised of a frame 62, a shelf 60, a shelf base tube, and a shelf collar 68. The frame 62 is made of angle iron. The shelf 60 can be made of metal mesh. Supports in the form of cross-pieces can be used beneath the shelf. The collar 68 is coupled to one side of the frame. The base tube (not shown) depends from the shelf. As may be seen in FIG. 11, the shelf assembly is intended to be placed below the deck assembly 27 and is secured in position by simultaneously sliding the shelf collar 68 around the crosspiece receiver tube 41 while bearing on the extension tube 37. A pin or other suitable coupling device may be inserted through the holes (not shown) in the frame cross-pieces and into corresponding holes in the extension tube 37. Although in the preferred embodiment the shelf 60 is made from a metal grate, this shelf 60 need not be made of metal or be a grate. Rather, the shelf 60 may be solid and be formed from any suitable material such as wood, plastic, fiberglass, or polycarbonate.

The operation and use of the pickup truck bed extender 11 of the preferred embodiment will now be described with reference to FIGS. 1-2, 15-17.

Figure 10:
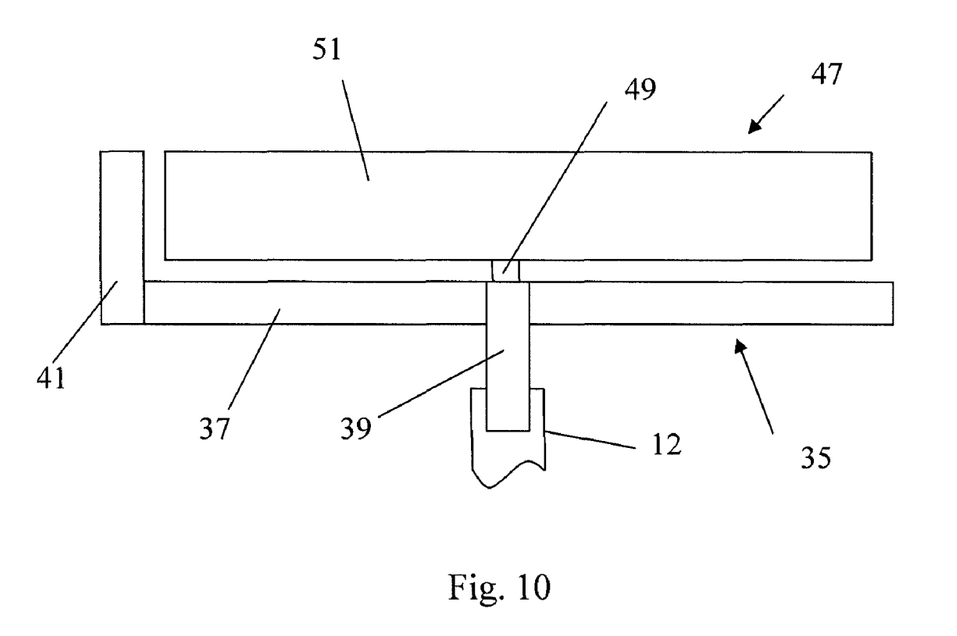
FIG. 10 is a top side plan view of the arm assembly in the stowed position.

The deck assembly 27, when stowed, may serve as the floor of the bed 14. If provided with hinges, it can be folded. Cargo can be placed on the floor assembly and the tailgate 10. The arm can be in a stowed position (FIG. 10) or an extended or use position (FIGS. 11-12). FIGS. 10-12 show the receiver hitch 12 in cross-section. The arm assembly is stowed by inserting the storage receiver tube 39 in the truck receiver hitch 12 (see FIG. 10). The crosspiece receiver tube 41 extends to the rear. Next the crosspiece assembly 47 is mounted to the extension tube. The crosspiece base 49 is inserted into the storage receiver tube 39 so that one of the crosspiece base holes 55 aligns with the storage receiver tube hole. A pin is then inserted through the receiver tube holes, the crosspiece base holes, the receiver hitch 12 holes, and secured with a retaining device such as wire. The arm 35 and crosspiece 47 form a step (see FIG. 2) for accessing the cargo area.

When the user desires to transport oversized cargo, the arm 35 and crosspiece 47 assemblies may be removed from the pickup's 13 receiver hitch 12 and disconnected from one another. Next, the end 70 of the receiver tube 37 is inserted into the pickup's 13 receiver hitch 12 so that the receiver tube hole 44 aligns with the receiver hitch hole. A pin is inserted through the receiver hitch 12 hole, and through the receiver tube hole 44. If the user desires to use the shelf assembly 59, this may be secured in position by simultaneously sliding the shelf collar 68 around the crosspiece receiver tube 41 while inserting the shelf base tube into the storage receiver tube 39. A pin or other suitable coupling device may be inserted through the holes (not shown) in the shelf base tube and into corresponding holes 43 in the storage receiver tube 39 to firmly secure the shelf assembly 59 to the arm assembly 35. In FIG. 12, only a few boards 29 are shown for illustrative purposes, it being understood that boards extend all the way across the crosspiece 51.

The crosspiece assembly 47 is then connected to the arm assembly 35 by inserting the crosspiece base 49 into the crosspiece receiver tube 41 so that one of the crosspiece base holes 55 aligns with one of the crosspiece receiver tube holes 43. The height of the crosspiece 51 can be adjusted so as to be level with the bed. The crosspiece 47 and arm 35 assemblies are then connected by inserting a pin through the crosspiece receiver tube hole 43, through the crosspiece base hole 55 and securing both assemblies with a retaining device. The pickup's 13 tailgate 10 is then lowered, if not already lowered, to allow the deck assembly 27 to be placed so that it rests on the upper surface of the crosspiece 51. The deck assembly 27 and crosspiece are removably coupled by inserting a retaining device such as a pin through the angle bracket hole 38 and crosspiece wing hole 54. The cargo may then be placed on top of the deck assembly 27.

Thus, the crosspiece assembly is received by both of the arm assembly's vertical members. One vertical member 39 receives the crosspiece assembly in the stowed position, while the other vertical member 41 receives the crosspiece assembly in the extended position.

Wires extend down from the crosspiece assembly; these are connected to the vehicle's lighting system. Once set up, the arm assembly 35 may block other motorists' views of the truck's tail lights. The arm assembly 35 is provided with side reflectors 56 as well as lights 53 that function as tail lights, showing turns, brakes and during low light (night) conditions. The use of the deck assembly and arm assembly and lowered tailgate may shield the vehicle's tail lights. Thus, the lights 53 on the crosspiece serve as tail lights for the vehicle.

The foregoing disclosure and showings made in the drawings are merely illustrative of the principles of this invention and are not to be interpreted in a limiting sense.

The invention claimed is:

1. A vehicle cargo area extender comprising:
   a) a deck having a bottom surface and a top surface, the deck being movable with respect to the vehicle, the deck is comprised of a plurality of planks coupled together; and
   b) an arm assembly comprising a horizontal member, a first vertical member and a second vertical member, the horizontal member having an end, the first and second vertical members being coupled to said horizontal member, and the second vertical member having an insertion end such that the insertion end is capable of being inserted into a trailer hitch receiver, wherein the arm assembly may be placed in a stowed position or a deployed position such that when in said stowed position, said second vertical member is structured and arranged to be coupled with the vehicle, such that said horizontal member is disposed along a horizontal plane substantially perpendicular to a longitudinal axis of said vehicle and when in said deployed position said horizontal member is structured and arranged such that said horizontal member end may be coupled to the vehicle and such that the first vertical member extends upwardly;
   c) a crosspiece having a stem for removably coupling to either the first vertical member when in the deployed position or a receiving opening adjacent to said second vertical member when in the stowed position, the receiving opening being opposite of the second vertical member insertion end;
   d) the deck further comprises angle brackets coupled to the deck planks and removably coupled to the crosspiece.

2. The vehicle cargo extender of claim 1 wherein two or more of the planks are coupled together with one or more hinges.

3. The vehicle cargo extender of claim 1 wherein the crosspiece has lights.

4. The vehicle cargo extender of claim 1 wherein the crosspiece has reflectors.

5. The vehicle cargo extender of claim 1 wherein the arm assembly in the stowed position forms a step when the arm assembly is coupled to a vehicle.

6. The vehicle cargo extender of claim 1 further comprising a shelf coupled to the arm assembly.

7. A vehicle cargo area extender comprising:
   a) a deck having a bottom surface and a to surface the deck being movable with respect to the vehicle; and
   b) an arm assembly comprising a horizontal member, a first vertical member and a second vertical member, the horizontal member having an end, the first and second vertical members being coupled to said horizontal member, and the second vertical member having an insertion end such that the insertion end is capable of being inserted into a trailer hitch receiver, wherein the arm assembly may be placed in a stowed position or a deployed position such that when in said stowed position, said second vertical member is structured and arranged to be coupled with the vehicle, such that said horizontal member is disposed along a horizontal plane substantially perpendicular to a longitudinal axis of said vehicle and when in said deployed position said horizontal member is structured and arranged such that said horizontal member end may be coupled to the vehicle and such that the first vertical member extends upwardly;
   c) a crosspiece having a stem for removably coupling to either the first vertical member when in the deployed position or a receiving opening adjacent to said second vertical member when in the stowed position, the receiving opening being opposite of the second vertical member insertion end;

d) the deck may be removably coupled to the crosspiece.

8. The vehicle cargo extender of claim 7 wherein the deck may be removably coupled to the crosspiece with pins.

9. A vehicle cargo area extender comprising:
a) a deck having a bottom surface and a top surface, the deck being movable with respect to the vehicle; and
b) an arm assembly comprising a horizontal member, a first vertical member and a second vertical member, the horizontal member having an end, the first and second vertical members being coupled to said horizontal member, and the second vertical member having an insertion end such that the insertion end is ca able of being inserted into a trailer hitch receiver, wherein the arm assembly may be placed in a stowed position or a deployed position such that when in said stowed position, said second vertical member is structured and arranged to be coupled with the vehicle, such that said horizontal member is disposed along a horizontal plane substantially perpendicular to a longitudinal axis of said vehicle and when in said deployed position said horizontal member is structured and arranged such that said horizontal member end may be coupled to the vehicle and such that the first vertical member extends upwardly;
c) a crosspiece having a stem for removably coupling to either the first vertical member when in the deployed position or a receiving opening adjacent to said second vertical member when in the stowed position, the receiving opening being opposite of the second vertical member insertion end;
d) said horizontal member has a first distance between the horizontal member end and the second vertical member and a second distance between a second end and the second vertical member, the first and second distances being substantially equal.

10. A vehicle cargo area extender comprising:
a) a deck having a bottom surface and a top surface, the deck being movable with respect to the vehicle; and
b) an arm assembly comprising a horizontal member, a first vertical member and a second vertical member, the horizontal member having an end, the first and second vertical members being coupled to said horizontal member, and the second vertical member having an insertion end such that the insertion end is capable of being inserted into a trailer hitch receiver, wherein the arm assembly may be placed in a stowed position or a deployed position such that when in said stowed position, said second vertical member is structured and arranged to be coupled with the vehicle, such that said horizontal member is disposed along a horizontal plane substantially perpendicular to a longitudinal axis of said vehicle and when in said deployed position said horizontal member is structured and arranged such that said horizontal member end may be coupled to the vehicle and such that the first vertical member extends upwardly;
c) a crosspiece having a stem for removably coupling to either the first vertical member when in the deployed position or a receiving opening adjacent to said second vertical member when in the stowed position, the receiving opening being opposite of the second vertical member insertion end;
d) said receiving opening is located on the second vertical member on an opposite end of the insertion end.

11. A vehicle cargo area extender comprising:
a) a deck having a bottom surface and a top surface, the deck being movable with respect to the vehicle wherein the deck is comprised of a plurality of planks coupled together and wherein the deck further comprises angle brackets coupled to the deck planks and removably coupled to a crosspiece; and
b) an arm assembly comprising a horizontal member, a first vertical member and a second vertical member, the horizontal member capable of being inserted into a trailer hitch receiver, the first and second vertical members being coupled to said horizontal member, and the second vertical member capable of being inserted into the trailer hitch receiver, wherein the arm assembly may be placed in a stowed position;
c) the crosspiece having a stem for removably coupling to either the first vertical member or the second vertical member.

12. The vehicle cargo extender of claim 11 wherein the deck may be removably coupled to the crosspiece.

13. The vehicle cargo extender of claim 12 wherein the deck may be removably coupled to the crosspiece with pins.

\* \* \* \* \*